(12) United States Patent
Tsao

(10) Patent No.: US 7,252,528 B1
(45) Date of Patent: Aug. 7, 2007

(54) MOUNTING ASSEMBLY FOR EXPANSION CARD

(75) Inventor: Wei-Ming Tsao, Shenzhen (CN)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/308,042

(22) Filed: Mar. 3, 2006

(51) Int. Cl.
*H05K 7/14* (2006.01)

(52) U.S. Cl. ..................... 439/327; 361/759
(58) Field of Classification Search ........... 439/327; 361/759, 801; 211/41.17
See application file for complete search history.

(56) References Cited

U.S. PATENT DOCUMENTS

| | | | |
|---|---|---|---|
| 5,822,193 A * | 10/1998 | Summers et al. | 361/759 |
| 6,069,796 A | 5/2000 | Hastings | |
| 6,215,668 B1 * | 4/2001 | Hass et al. | 361/759 |
| 6,231,139 B1 | 5/2001 | Chen | |
| 6,357,603 B1 | 3/2002 | Dingman | |
| 6,552,913 B2 | 4/2003 | Tournadre | |
| 7,057,902 B2 * | 6/2006 | Li | 361/801 |

\* cited by examiner

*Primary Examiner*—Neil Abrams
(74) *Attorney, Agent, or Firm*—Wei Te Chung

(57) ABSTRACT

A mounting assembly includes an expansion card having a slot cover, a chassis having a rear wall, the rear wall forming two opposite support tabs thereon, and a pivoting member pivotally mounted to the chassis between the two support tabs. The rear wall defines a through slot below the two support tabs for the slot cover covering thereon. At least one support tab forms a positioning portion thereon. The slot cover has a fixing portion thereon. The pivoting member has a locking portion for engaging with the positioning portion, and a retaining portion for pressing on the fixing portion of the slot cover. The mounting assembly further includes a positioning block securely attached to the chassis opposite to the rear wall of the chassis, and another pivoting member pivotally mounted to the positioning block for retaining another end of the expansion card.

20 Claims, 8 Drawing Sheets

MOUNTING ASSEMBLY FOR EXPANSION CARD

FIELD OF THE INVENTION

The present invention relates to mounting assemblies, and more particularly to a mounting assembly which readily and firmly secures an expansion card in a computer chassis.

DESCRIPTION OF RELATED ART

Nowadays, most computer systems or other electronic devices employ a plurality of circuit cards, such as expansion cards, adapters, and PC boards. These cards or boards are typically mounted to a computer motherboard in a perpendicular fashion relative to the computer motherboard. In particular, the cards are usually inserted into edge card connectors, which are mounted on the computer motherboard. However, merely inserting a card into an edge card connector is typically insufficient to securely maintain the card within the computer chassis. A card connected in this fashion could easily disconnect from the edge card connector, which may prevent, or significantly inhibit, acceptable operation of the computer. Accordingly, additional structure is normally required to secure a card within a computer chassis. A conventional manner of securing a card within a computer chassis is to provide a card bracket fastened to the computer chassis with a removable screw. Specifically, each mounting bracket is normally disposed across a card slot formed in the computer chassis and may include an aperture through which the screw may pass. However, securing a card-mounting bracket to a computer chassis by using a screw that passes through the bracket and into the computer chassis may present problems. One significant disadvantage of a screw-secured bracket is that the screw is often inadvertently dropped into the computer chassis during installation and removal of the bracket.

A typical mounting assembly for securing expansion cards includes a rear panel and a fixing cover attached to the rear panel. The rear panel defines a plurality of expansion slots for receiving expansion cards. A fixing plate is stamped from the rear panel adjacent to an end of the expansion slots and forms a plurality of protrusions. Each expansion card includes a slot cover forming a bent portion for abutting against the fixing plate. Each bent portion defines a cutout for engaging with the protrusion of the fixing plate thereby positioning the expansion cards. The fixing cover forms a plurality of elastic tabs for pressing the bent portion of the slot cover thereby fixing the expansion cards. A pair of through holes is defined in the fixing cover and a pair of screw holes is correspondingly defined in the rear panel. A pair of bolts extends through the through holes and threadedly engages in the screw holes thereby fixing the fixing cover to the rear panel. However, the above-described operation of the mounting assembly for securing expansion cards is comparatively complicated. Furthermore, the fixing cover has to be released from the rear panel when a new expansion card is inserted into the chassis or some mounted expansion cards need to be taken out of the chassis due to repair. Thus, it is possible to cause other expansion cards to come loose, thereby influencing the stability of the computer system in operation.

What is needed, therefore, is a mounting assembly which readily and firmly secures an expansion card to a computer chassis.

SUMMARY OF INVENTION

A mounting assembly includes an expansion card having a slot cover, a chassis having a rear wall, the rear wall forming two opposite support tabs thereon, and a pivoting member pivotally mounted to the chassis between the two support tabs. The rear wall defines a through slot below the support tabs for the slot cover covering thereon. At least one support tab forms a positioning portion thereon. The slot cover has a fixing portion thereon. The pivoting member has a locking portion for engaging with the positioning portion, and a retaining portion for pressing on the fixing portion of the slot cover.

Other advantages and novel features will be drawn from the following detailed description of preferred embodiments with the attached drawings, in which:

DETAILED DESCRIPTION

Figure 1:
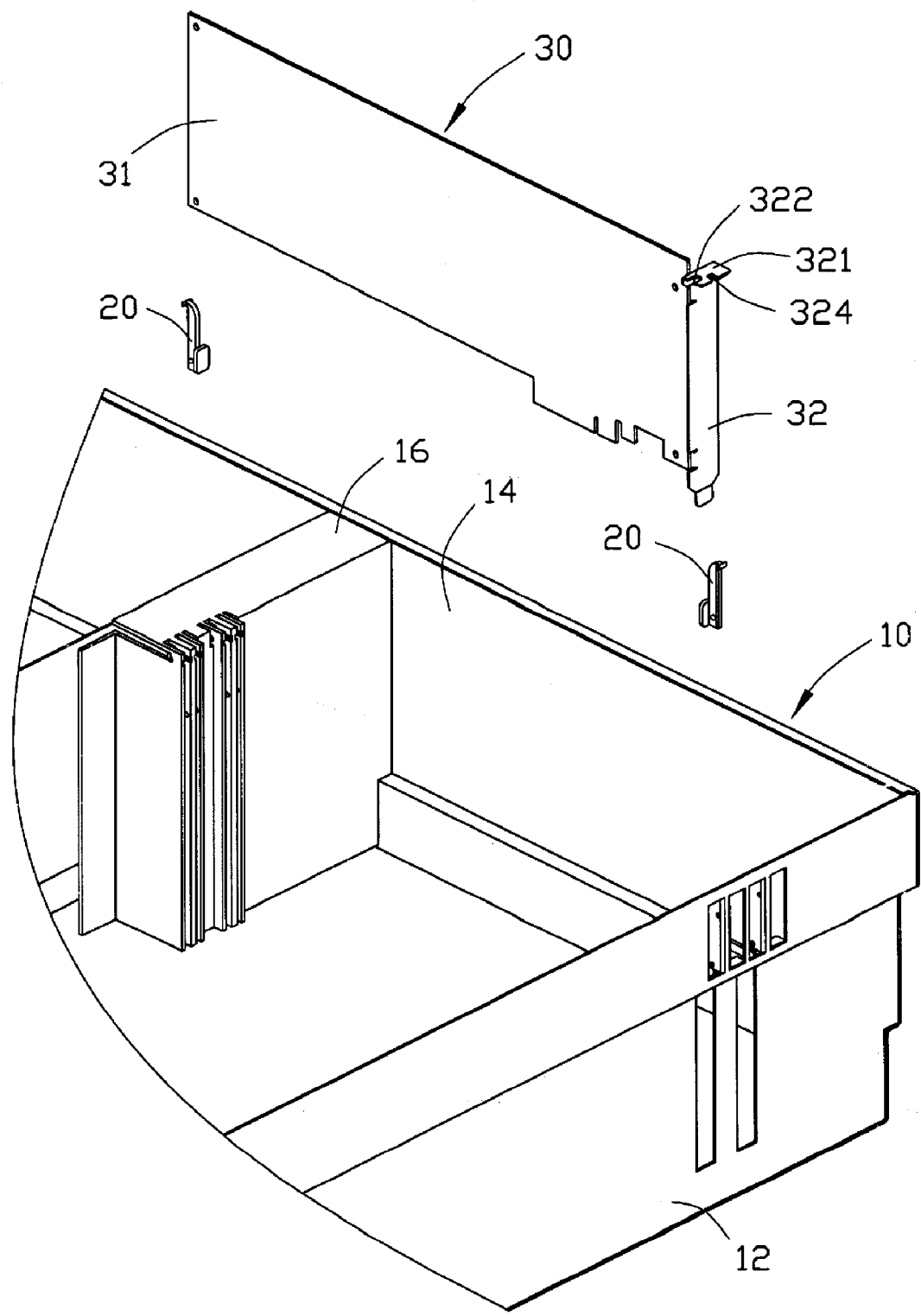
FIG. 1 is a partial view of a computer chassis with an exploded, isometric view of a mounting assembly in accordance with a preferred embodiment of the invention, the mounting assembly including a pair of pivoting members, and an expansion card.
Figure 2:
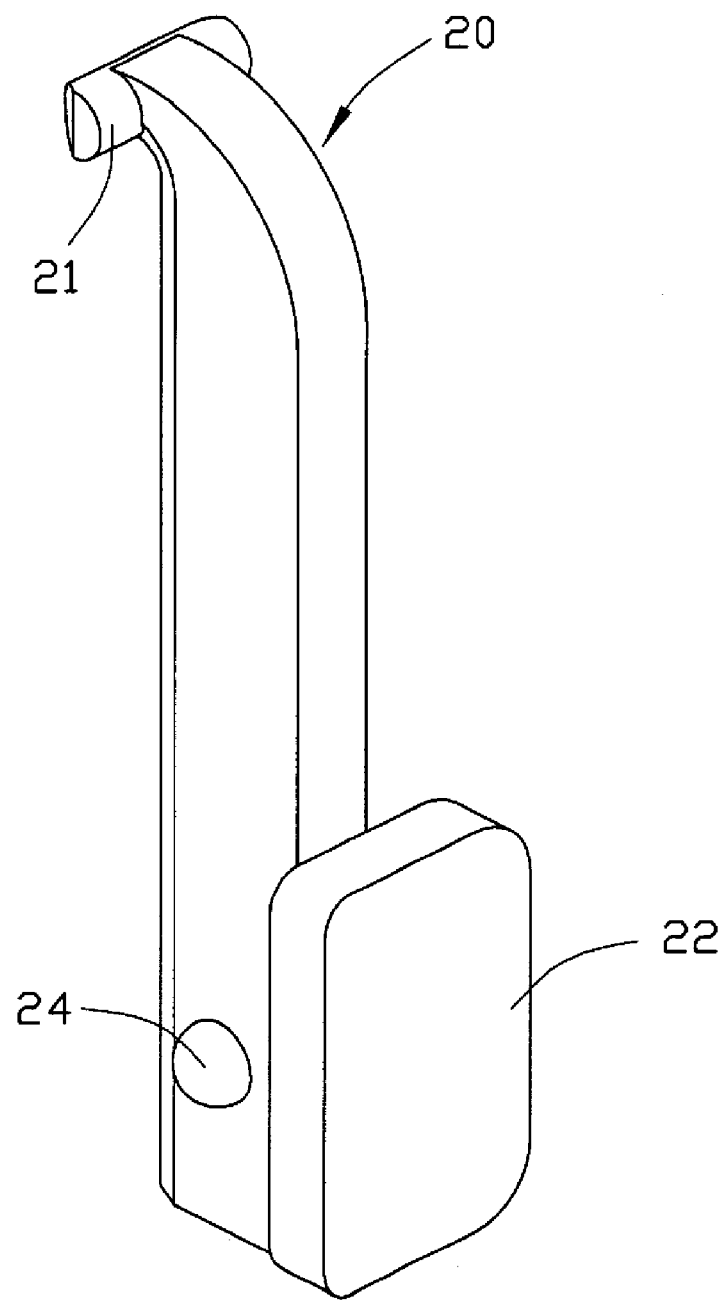
FIG. 2 is an enlarged view of one of the pivoting members of FIG. 1.
Figure 3:
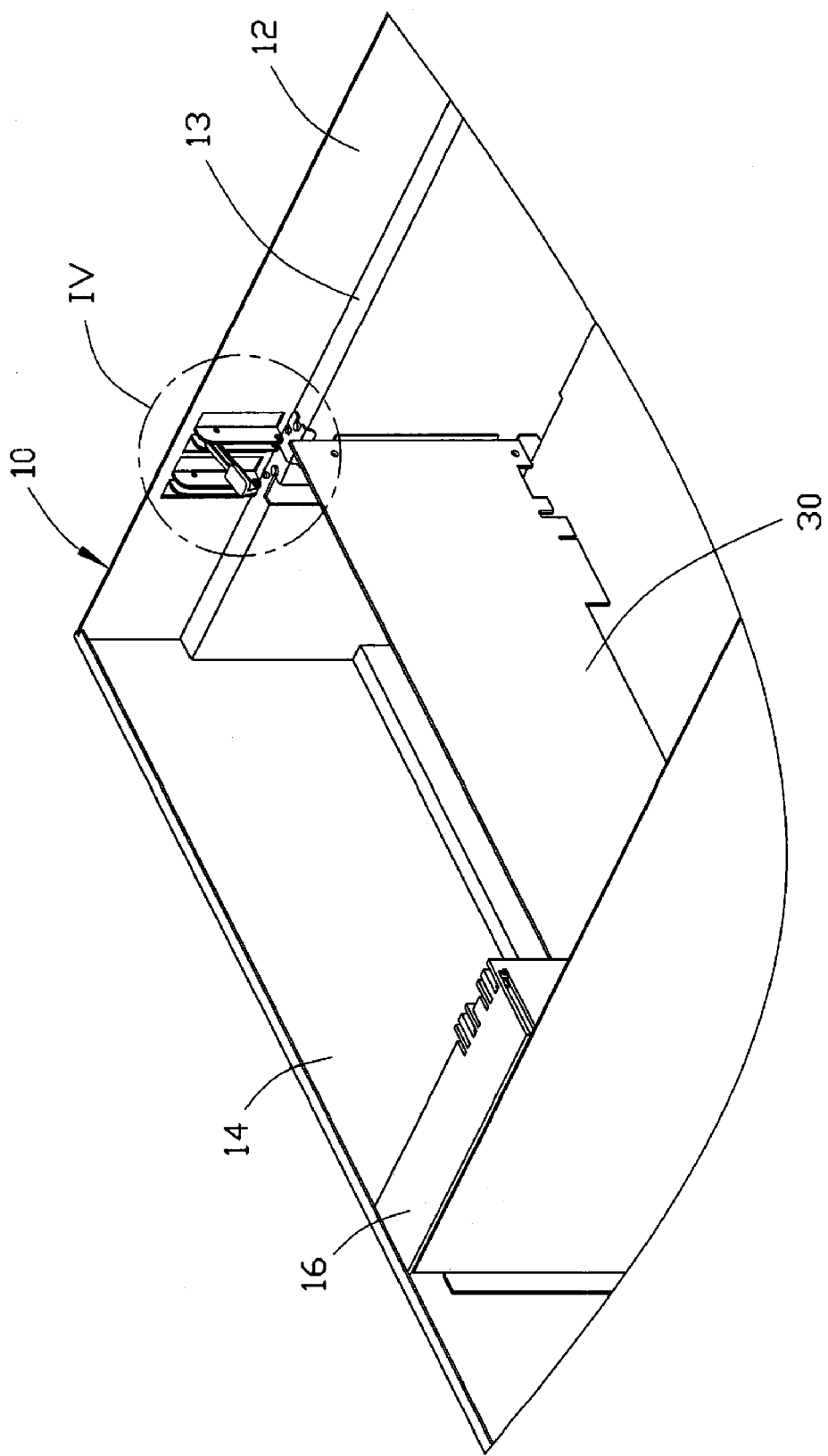
FIG. 3 is a pre-assembled view of the mounting assembly of FIG. 1, but viewed from another aspect.

Referring to FIG. 1, a mounting assembly in accordance with a preferred embodiment of the invention, which secures an expansion card to a computer chassis, includes a computer chassis 10, a pair of pivoting members 20, and an expansion card 30.

Referring also to FIGS. 2 to 6, the computer chassis 10 includes a bottom wall, a rear wall 12 perpendicularly extending up from the bottom wall, and a sidewall 14 connected vertically with the rear wall 12. The rear wall 12 is bent horizontally to form a shoulder 13. A plurality of juxtaposed L-shaped through slots 124 is defined in the shoulder 13 and a lower portion of the rear wall 12. Two protruding posts 132, 134 extend vertically from the shoulder 13 adjacent to each through slot 124. Two parallel support tabs 125 above each of the through slots 124, are formed on an upper portion of the rear wall 12 by stamping. A pivot hole 127 is defined in an upper portion of each support tab 125. A positioning portion 129 is formed on a lower portion of each support tab 125. In the preferred embodiment, the positioning portion 129 can be a positioning hole defined in the support tab 125. A positioning block 16 is fixedly attached to the sidewall 14 of the chassis 10, opposite to the rear wall 12. A plurality of spaced narrow slots 161 is defined in the positioning block 16, thereby forming a plurality of side plates 164 thereon. Two opposite horizontal guiding slots 162 are defined in an upper portion of each of the narrow slots 161. A pivot hole 165 is defined in each of the side plates 164 at an end of each of the guiding slots 162. A positioning portion 166 is formed on a lower portion of each side plate 164. In the preferred embodiment, the positioning portion 166 can be a positioning hole defined in each of the side plates 164.

The pair of pivoting members 20 is pivotally mounted to the support tabs 125 of the rear wall 12 and the positioning block 16 respectively. Each of the pivoting members 20 includes a pivot pin 21 formed on a top end thereof, and a retaining portion 22 formed on a lower portion thereof. The retaining portion 22 of the pivoting member 20 has a bottom surface perpendicular to a radius of rotation of the pivot member 20. A pair of locking portions 24 is respectively formed on the two sides of each pivoting member 20 adjacent to the retaining portion 22. In the preferred embodiment, the locking portion 24 can be a protrusion formed on each pivoting member 20.

The expansion card 30 includes a circuit board 31 and a slot cover 32 perpendicularly attached to a rear edge of the circuit board 31. The slot cover 32 has a horizontal fixing portion 321 at a free end thereof. The fixing portion 321 defines a transverse U-shaped cutout 322 and a longitudinal U-shaped cutout 324 therein.

Figure 4:
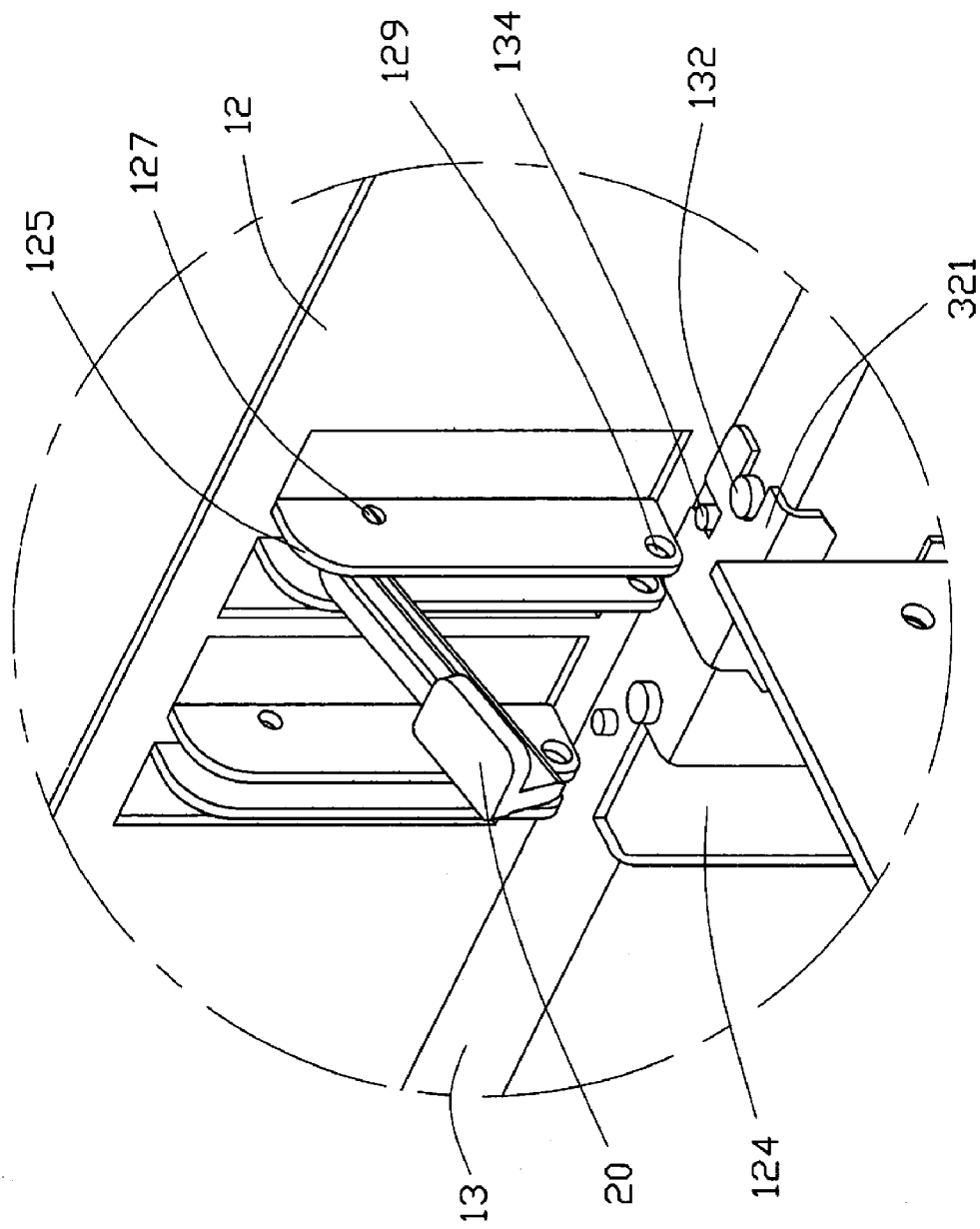
FIG. 4 is an enlarged view of a circle portion □ of FIG. 3.
Figure 5:
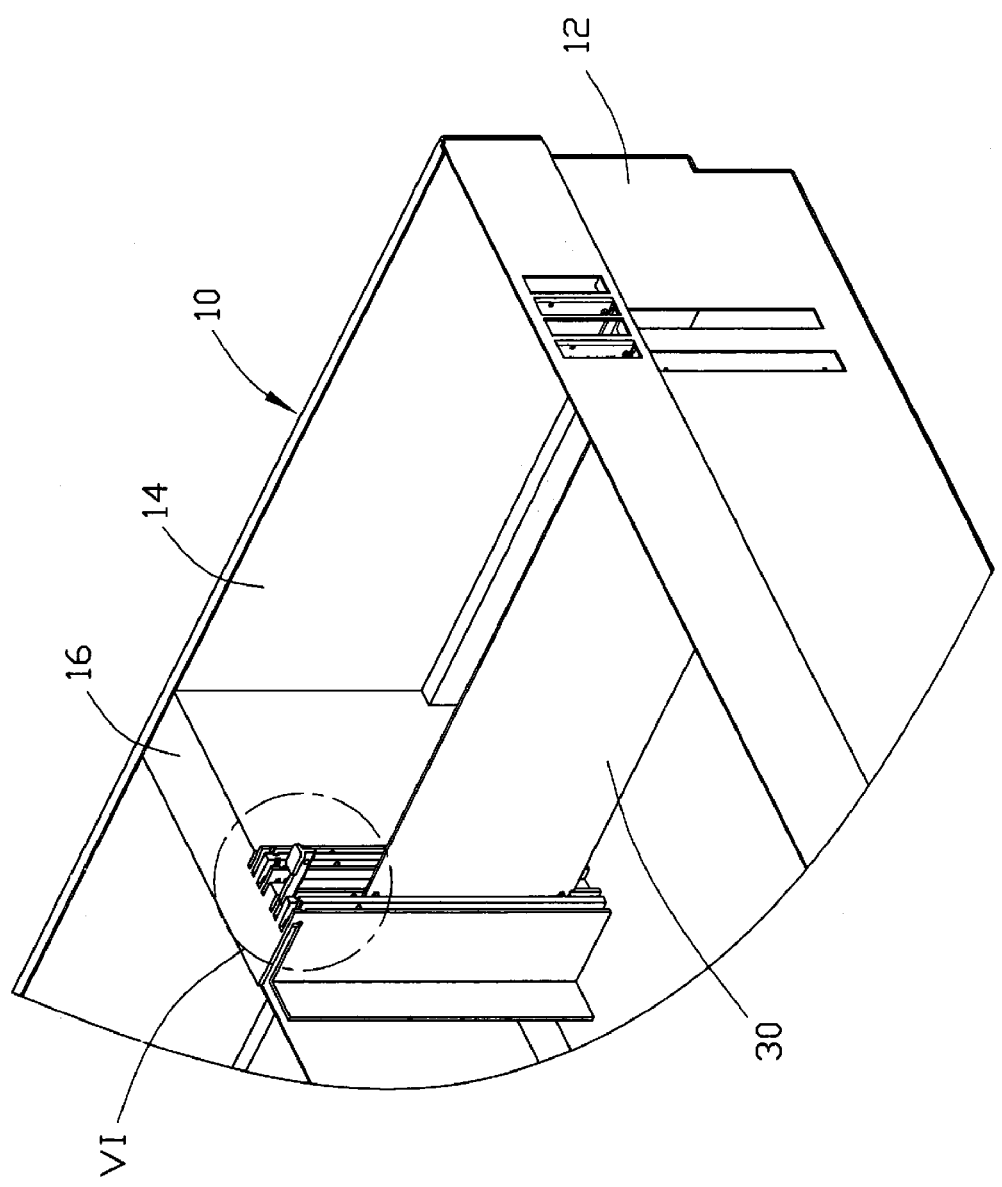
FIG. 5 is a pre-assembled view of the mounting assembly of FIG. 1.
Figure 6:
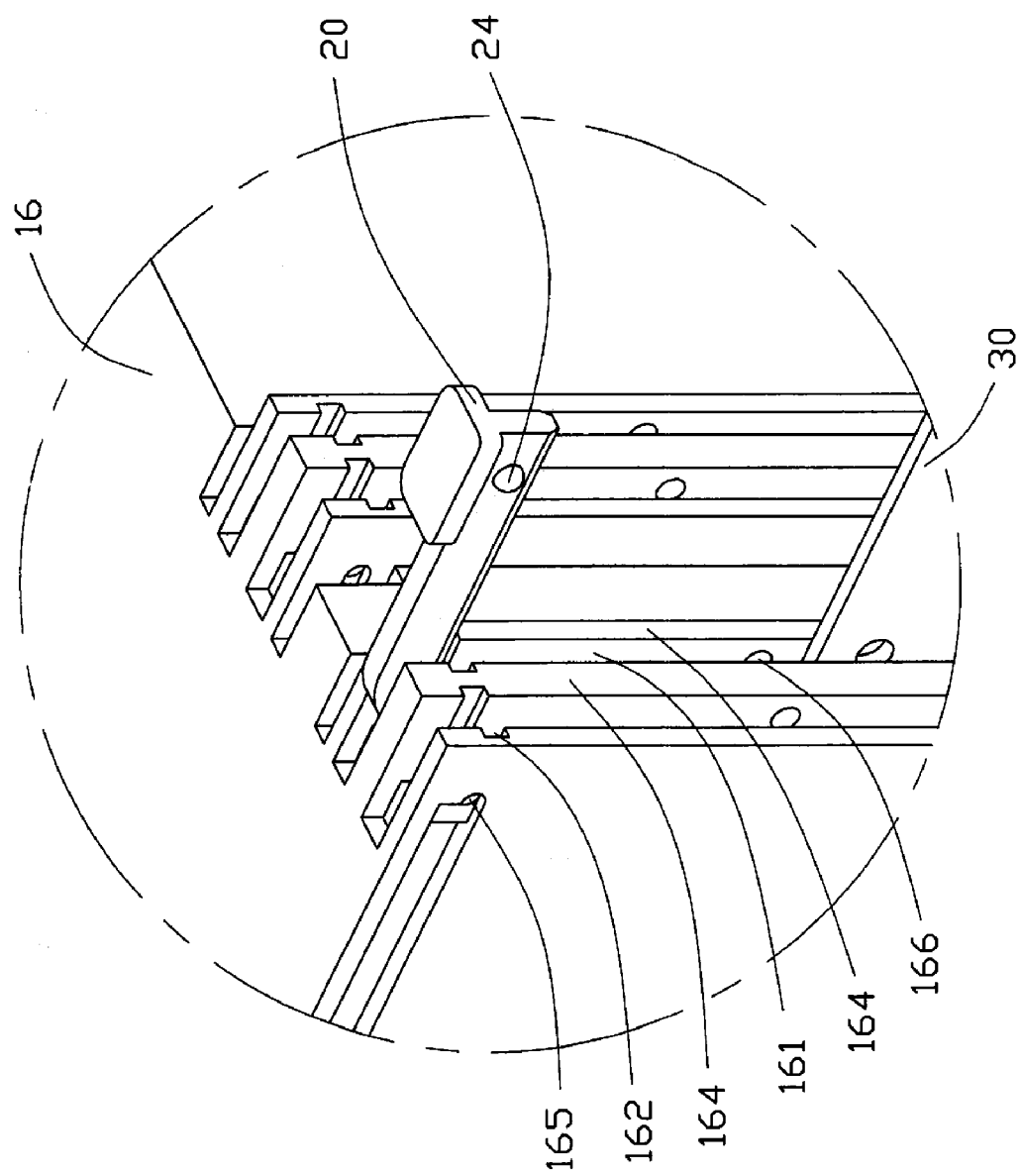
FIG. 6 is an enlarged view of a circle portion □ of FIG. 5.

Referring also to FIGS. 4, 5 and 6, in assembly, the pivot pin 21 of one of the pivoting members 20 are first inserted into the corresponding pivot holes 127 of the two support tabs 125 respectively, thereby allowing rotation of the pivoting member 20 about the pivot pin 21. The pivot pin 21 of the other pivoting member 20 is pushed inward to slide along the guiding slots 162 until the pivot pin 21 snappingly engages in the pivot hole 165, thereby allowing the other pivoting member 20 to be pivotally mounted to the positioning block 16.

Figure 7:
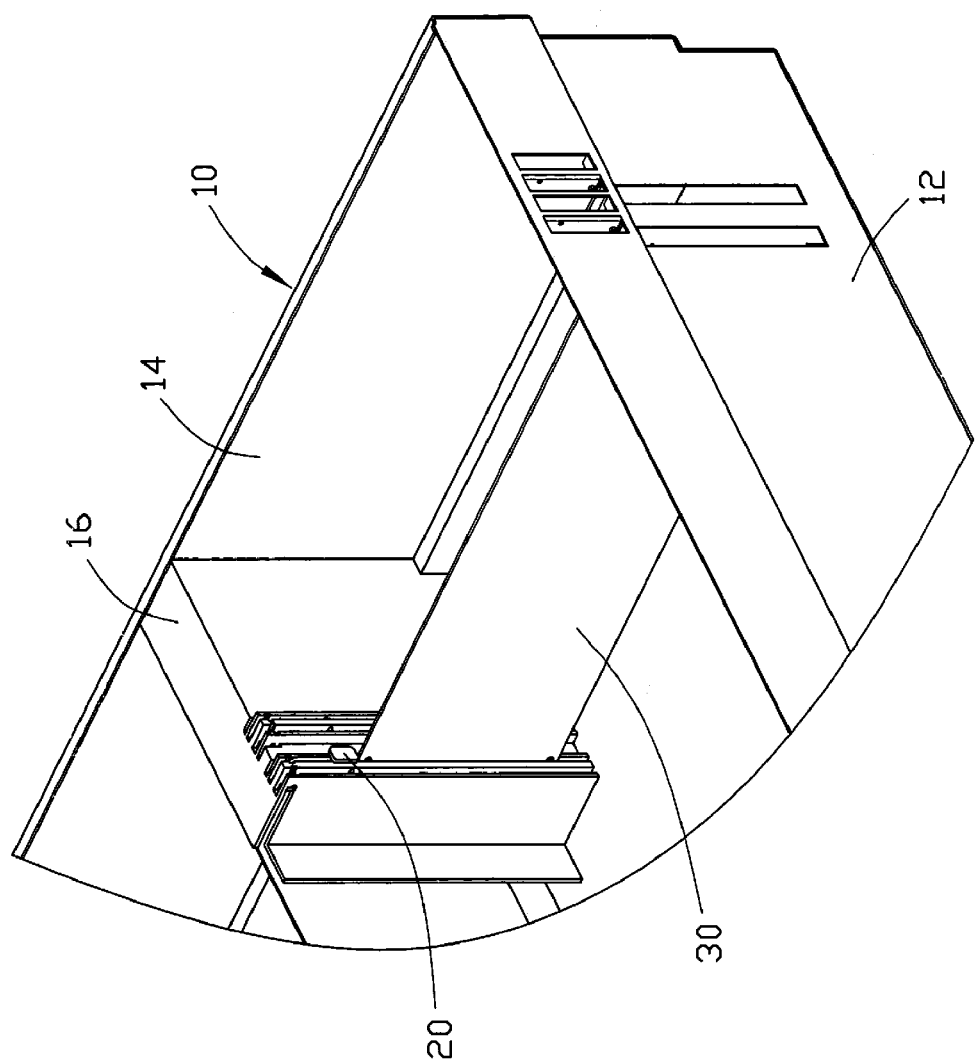
FIG. 7 is an assembled view of the mounting assembly of FIG. 1.
Figure 8:
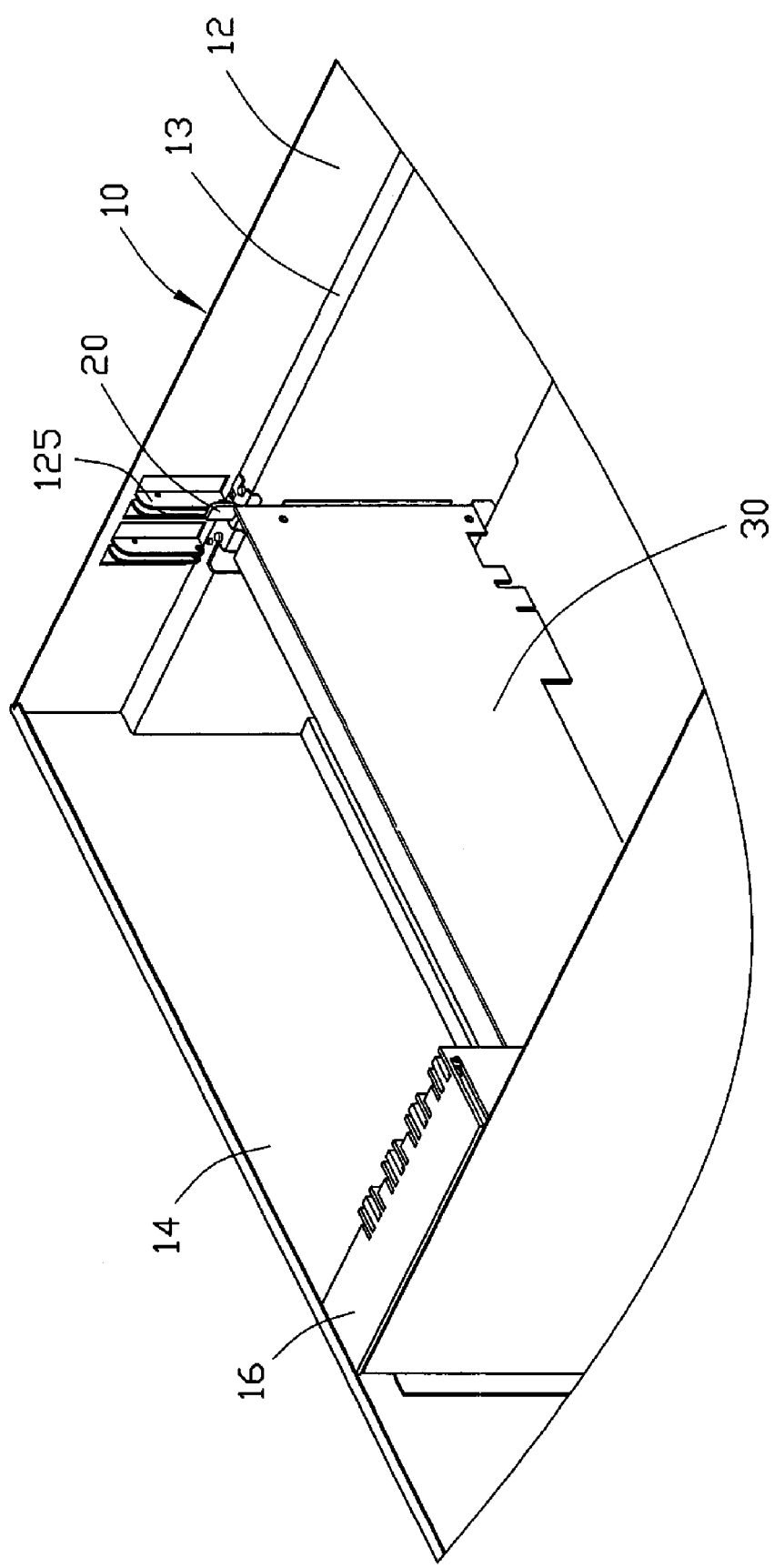
FIG. 8 is another assembled view of the mounting assembly of FIG. 1, but viewed from another aspect.

Referring to FIGS. 7 and 8, in assembly of the expansion card 30, the expansion card 30 is pressed down to urge the contacts of the expansion card 30 to tightly insert into a connector of a motherboard (not shown). Simultaneously, the fixing portion 321 of the slot cover 32 is disposed on the shoulder 13, and the protruding posts 132, 134 extend through the cutouts 322, 324 respectively. The other end of the circuit board 31 of the expansion card 30 slides down along the narrow slot 161 of the positioning block 16. When the contacts of the expansion card 30 are electrically connected with the connector of the motherboard, the pivoting member 20 mounted on the rear wall 12 is pivoted down to urge a bottom end of the retaining portion 22 to retain the fixing portion 321 of the slot cover 32, thereby sandwiching the fixing portion 321 with the shoulder 13. Then the pivoting member 20 mounted on the positioning block 16 is also pivoted down to urge the bottom surface of the retaining portion 22 to press on an upper end of the circuit board 31 of the expansion card 30. Then the locking portions 24 of the two pivoting members 20 snappingly engage with the positioning portions 129 of the two support tabs 125 and the positioning portions 166 of the two side plates 164 respectively, thereby securely attaching the expansion card 30 to the chassis 10. This is a locked position and the retaining portion 22 of the pivoting member 20 cooperates with the shoulder 13 of the rear wall 12 to sandwich the fixing portion 321 of the slot cover 32 therebetween. The expansion card 30 is thus locked in position. Accordingly, the expansion card 30 is held in a fixed position to maintain a good electrical connection with the motherboard.

In removal of the expansion card 30, the two pivoting members 20 are pulled to rotate upward. Then the locking portions 24 of the two pivoting members 20 disengage from the positioning portions 129 of the two support tabs 125 and the positioning portions 166 of the two side plates 164 respectively, thereby releasing the expansion card 30 from the rear wall 12 of the chassis 10 and the positioning block 16. This is an unlocked position and the mounting assembly is unlocked and the expansion card 30 is ready to be removed. Finally, the expansion card 30 is lifted up until the contacts of the expansion card 30 disengage with the connector of the motherboard. Thus, the expansion card 30 can be easily removed from the chassis 10.

In addition, in another preferred embodiment, different locating structures may be arranged on the chassis 10 and the pivoting member 20, for locating the pivoting members 20 with respect to the rear wall 11 and the positioning block 16. For example, the positioning portions 129, 166 may be protrusions formed on the support tab 125 and each of the side plates 164, and the locking portions 24 of the pivoting members 20 may be positioning holes defined in the pivoting members 20 adjacent to the retaining portion 22.

While the present invention has been illustrated by the description of preferred embodiments thereof, and while the preferred embodiments have been described in considerable detail, it is not intended to restrict or in any way limit the scope of the appended claims to such details. Additional advantages and modifications within the spirit and scope of the present invention will readily appear to those skilled in the art. Therefore, the present invention is not limited to the specific details and illustrative examples shown and described.

What is claimed is:

1. A mounting assembly comprising:
   an expansion card having a slot cover, the slot cover having a fixing portion thereon;
   a chassis having a rear wall, the rear wall having two opposite support tabs thereon, the rear wall defining a through slot below the support tabs for the slot cover covering thereon, at least one support tab forming a positioning portion thereon; and
   a pivoting member having an end portion pivotally mounted to the chassis between the two support tabs, and an opposite end portion having at least one locking portion engaging with the positioning portion of the at least one support tab and a retaining portion pressing the fixing portion of the slot cover.

2. The mounting assembly as described in claim 1, wherein the positioning portion is a positioning hole defined in the at least one support tab, and the locking portion is a protrusion formed on the pivoting member, the protrusion engaging in the positioning hole.

3. The mounting assembly as described in claim 1, wherein the rear wall is bent to form a shoulder for supporting the fixing portion of the slot cover, thereby sandwiching the fixing portion with the retaining portion of the pivoting member.

4. The mounting assembly as described in claim 3, wherein the fixing portion of the slot cover defines at least one cutout therein, and at least one protruding post extends from the shoulder for engaging in the cutout.

5. The mounting assembly as described in claim 1, further comprising a positioning block securely attached to the chassis opposite to the rear wall of the chassis, and another pivoting member pivotally mounted to the positioning block.

6. The mounting assembly as described in claim 5, wherein the positioning block defines a slot therein to pivotally receive said another pivoting member.

7. The mounting assembly as described in claim 5, wherein said another pivoting member forms a locking portion thereon, and the positioning block has a positioning portion thereon for engaging with the locking portion.

8. The mounting assembly as described in claim 7, wherein the locking portion is a protrusion, and the positioning portion is a positioning hole, the protrusion engaging in the positioning hole.

9. The mounting assembly as described in claim 5, wherein the at least one locking portion of the pivot member is capable of being rotated to insert between the support tabs of the rear wall and resiliently deform the at least one support tab until the at least one locking portion engages with the positioning portion of the at least one support tab and the retaining portion presses on the fixing portion of the slot cover, and the at least one support tab rebounds to an original state thereby blocking the locking portion detaching from the support tab.

10. A mounting assembly comprising:
   an expansion card comprising a slot cover, the slot cover comprising a fixing portion;
   a chassis comprising a bottom wall and a rear wall perpendicularly extending from the bottom wall, the rear wall defining at least one through slot for the slot cover covering thereon, the rear wall forming a positioning portion thereon; and
   a pivoting member mounted to the chassis and pivotable within the chassis between an unlocked position and a locked position about an axis parallel to the bottom wall, the pivoting member comprising a retaining portion for pressing the fixing portion of the slot cover while the pivoting member is pivoted to the locked position and to release the fixing portion of the slot cover while the pivoting member is pivoted to the unlocked position, and a locking portion engaging with the positioning portion for preventing the pivoting member from freely rotating while the pivoting member is pivoted to the locked position.

11. The mounting assembly as described in claim 10, wherein the positioning portion comprises a protrusion formed on one of the rear wall and the pivoting member, and a positioning hole defined in the other of the rear wall and the pivoting member, the protrusion engaging in the positioning hole in the locked position.

12. The mounting assembly as described in claim 10, wherein the rear wall forms a shoulder for supporting the fixing portion of the slot cover, thereby sandwiching the fixing portion with the retaining portion of the pivoting member.

13. The mounting assembly as claimed in claim 12, wherein the fixing portion of the slot cover defines at least one cutout therein, and at least one protruding post extends from the shoulder for engaging in the cutout.

14. The mounting assembly as described in claim 10, further comprising a positioning block securely attached to the chassis, and another pivoting member pivotally mounted to the positioning block.

15. The mounting assembly as described in claim 14, wherein said another pivoting member forms a locking portion thereon, and the positioning block has a positioning portion thereon for engaging with the locking portion.

16. The mounting assembly as described in claim 10, wherein the retaining portion of the pivoting member has a surface perpendicular to a radius of rotation of the pivot member to press the fixing portion of the slot cover while the pivoting member is pivoted to the locked position.

17. A mounting assembly comprising:
   a chassis comprising a wall forming a shoulder for supporting a slot cover of an expansion card thereon, two spaced openings being adjacently defined in the wall above the shoulder, two parallel support tabs being perpendicularly bent in from adjacent edges of the two openings;
   a pivoting member pivotally mounted between the support tabs of the wall, the pivoting member comprising a retaining portion for sandwiching the slot cover with the shoulder when the pivoting member is pivoted to a locked position; and
   a locating structure formed on the support tabs of the wall and the pivoting member for preventing the pivoting member from freely rotating while in the locked position.

18. The mounting assembly of claim 17, wherein the locating structure comprises a positioning hole defined in one of the rear wall and the pivoting member, and a protrusion formed on the other of the rear wall and the pivoting member, the protrusion engaging in the positioning hole in the locked position.

19. The mounting assembly of claim 17, further comprising a positioning block securely attached to the chassis, and another pivoting member pivotally mounted to the positioning block.

20. The mounting assembly of claim 19, wherein said another pivoting member comprises a locking portion thereon for engaging with the positioning block, and a retaining portion thereon for pressing on the expansion card.

* * * * *